K. RÖDER.
QUICK CLOSING THROTTLE VALVE FOR TURBINES.
APPLICATION FILED MAY 13, 1915.
1,204,687.  Patented Nov. 14, 1916.
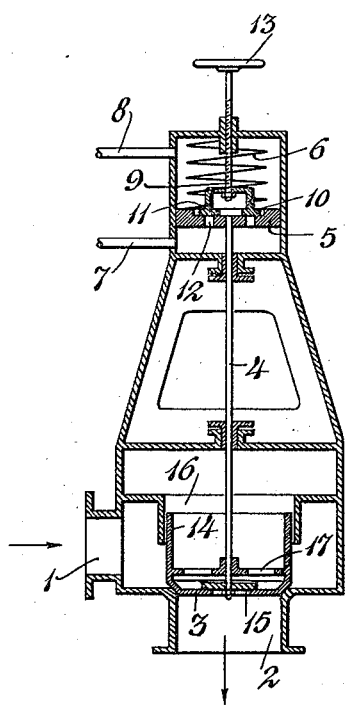
WITNESSES
INVENTOR
KARL RÖDER
BY
ATTORNEYS

UNITED STATES PATENT OFFICE.

KARL RÖDER, OF MÜLHEIM-ON-THE-RUHR, GERMANY.

QUICK-CLOSING THROTTLE-VALVE FOR TURBINES.

1,204,687.  Specification of Letters Patent.  Patented Nov. 14, 1916.

Application filed May 13, 1915. Serial No. 27,959.

*To all whom it may concern:*

Be it known that I, KARL RÖDER, a citizen of the German Empire, residing at Mülheim-on-the-Ruhr, Germany, have invented a new and useful Improvement in Quick-Closing Throttle-Valves for Turbines, of which the following is a specification.

My invention relates to throttle valves for use in quickly shutting off (and for again starting up) turbines driven by steam, compressed air, and other fluid media and has for its object to provide an improved construction having a novel mode of operation whereby certain disadvantages attendant upon such valves, as hitherto known, are avoided and whereby certain and reliable results are insured.

More particularly my invention relates to that type of valves of the class referred to in which the valve, when open, is so held by oil pressure developed by any suitable means, as by an independent pump, acting against the pressure of a suitable spring and in which the valve is closed with great quickness by said spring pressure as soon as the oil pressure is relieved, a small auxiliary or by pass valve, operated either manually or by a safety governor, being placed in the oil supply pipe for such purpose. To many such valves, as known and used in the prior art, there has attached the disadvantage that, upon closure of the auxiliary or by pass valve, the main valve would tend to be so forcibly and suddenly opened by the thus restored oil pressure that serious operative disturbances would result. While various arrangements have been suggested to avoid the difficulty just referred to they have been, to a large degree, complicated and unreliable.

In my improvement, now to be described, I have avoided the defect mentioned and provided a valve which can be closed with great quickness but cannot be opened again except slowly and intentionally. Any accidental closure of the auxiliary valve, e. g., so as to renew the oil pressure, will have no effect in moving and opening the main valve.

My invention will be better understood by referring to the accompanying drawing which represents an axial section, diagrammatic in character, through a throttle valve constructed according to my invention.

In the drawing 1 represents the main supply pipe for the steam or other medium used to drive the turbine, 2 the turbine inlet pipe, and 3 the main valve which controls the connection between 1 and 2. This valve 3 is adapted to be raised when the steam supply is turned on and lowered when the same is closed by means of a piston rod 4 to which is fixed a piston 5 slidable in a suitable piston cylinder. A spring 6 is held in compression between the upper cylinder head and the top of the piston so as to exert a downward pressure thereupon. A conduit or pipe 7 leads from a suitable source (not shown) of oil pressure into the piston cylinder beneath the lowest point to which the piston is permitted to descend, and a similar conduit or pipe 8 leads from the upper part of the cylinder to a suitable oil holding receptacle.

An axially disposed spindle 9 has screw threaded adjustment with and through the upper cylinder end and carries at its lower end a cap 10 to the bottom edge of which is fixed a flat ring 11; this cap is preferably rotatably mounted upon the spindle but is immovable linearly thereupon. The piston 5 is provided with an annularly disposed series of openings 12 adapted to be covered by the ring 11 when the spindle 9 is sufficiently screwed down.

In the pipe 7, but not shown, since not constituting a part of my invention, is a suitable by pass valve which may be operated either manually, or automatically by a safety governor or regulating device, so as to either relieve the oil pressure developed in said pipe or to throw on said pressure as the case may be.

In order that, on raising the valve 3, the great thrust produced by the pressure exerted by the steam on the whole valve surface need not be overcome, the valve 3 is fitted with a piston 14 and an auxiliary valve 15. As the piston 5 begins its upward movement, and until valve 15 reaches the perforated partition plate 17, only the pressure exerted on the essentially smaller surface of the auxiliary valve 15 need be overcome. As soon as the latter has been opened, the steam escaping around the piston 14 into the space 16 can flow into the turbine. As the piston 5 continues to rise the main valve 3 will be easily lifted by the auxiliary valve 15 acting against the perforated plate 17.

The operation of my invention is as follows: With the parts in the position shown in the drawing, and with a suitable oil pressure existing in pipe 7 and in the space beneath the piston, if it is desired to start the turbine, the hand wheel 13 is turned so as to raise the ring 11. As the ring rises the oil pressure beneath the piston will correspondingly raise the piston and keep it pressed against the ring. This raising of the cap and consequent opening of the valve 3 may continue until the valve is fully raised and the steam supply is fully on. If, now, it is desired to shut off the steam supply to the turbine, the by pass valve, previously alluded to as being in the pipe 7, is opened so as to relieve the oil pressure. This permits the spring 6 to force the piston 5 downwardly so that the oil beneath the piston, as the piston moves away from the ring 11, will pass up through the openings 12 into the free space above the piston and out through the pipe 8. As the openings 12 may be numerous and of generous area this closure takes place with great quickness. If, after the valve has been closed as above described, the by pass valve in pipe 7 is again closed so as to restore the oil pressure beneath the piston 5, the oil will simply be pressed up through the openings 12 and out through pipe 8 without raising the piston and thereby opening the main valve. To again start the turbine the ring 11 is again screwed down into contact with the upper surface of the piston so as to close the openings 12. If then the cap 10 be duly raised by turning back the hand wheel 13 the piston 5 will follow and open valve 3.

It will be seen from the foregoing description that my improved valve has very few parts and is exceedingly simple both in construction and in operation. These facts cause the use of my valve to be attended with great reliability.

It will be noted as an advantage of my invention that the turbine can never be started until the oil pressure is established through the pump or other means which has been arranged therefor; nor can it be started even then until the auxiliary valve in the oil conduit has been closed. In consequence the turbine, when it is attempted to be first started after a period of disuse, can only be started gradually. There is, thus, double security against accidental starting up of the turbine.

In two pressure turbines the two main valves may be simultaneously operated.

In multi-step turbines when steam is taken off for auxiliary devices between two stages the safety governor can be used not only for closing the live steam valve but also for closing the overflow valve in front of the low pressure part provided said overflow valve is controlled by oil pressure.

The spring 6 may be so constructed, that if the oil pressure falls below a certain predetermined value, i. e., if irregularities occur in the feeding of the oil, the main valve will be closed completely whereby accidents resulting from lack of oil are made impossible.

It is possible to open the apertures 12 by a relative rotation or lateral movement of the parts instead of by a relative raising or lowering.

Other changes in detail may be made within the scope of my invention and,

Having described said invention above, I now claim:

1. A quick closing throttle valve for turbines comprising, in combination, a main valve for controlling the admission of steam to the turbine, a piston having openings therethrough and connected with said main valve, a cylinder for said piston having an oil pressure source upon one side and an oil outflow pipe upon the other side of the piston, and means for closing said piston openings preparatory to opening said valve when it is desired to start the turbine.

2. A quick closing throttle valve for turbines comprising, in combination, a main valve for controlling the admission of steam to the turbine, a piston having openings therethrough and connected with said main valve, a cylinder for said piston having an oil pressure source upon one side and an oil outflow pipe upon the other side of the piston, a spring adapted to press the piston toward the oil pressure source, and means for closing said piston openings preparatory to opening said valve when it is desired to start the turbine.

3. A quick closing throttle valve for turbines comprising, in combination, a main valve for controlling the admission of steam to the turbine, a piston having openings therethrough and connected with said main valve, a cylinder for said piston having an oil pressure source upon one side and an oil outflow pipe upon the other side of the piston, a spring adapted to press the piston toward the oil pressure source, means movable between the cylinder head and the piston for closing the piston openings preparatory to opening said valve when it is desired to start the turbine.

4. A quick closing throttle valve for turbines comprising, in combination, a main valve for controlling the admission of steam to the turbine, a piston having openings therethrough and connected with said main valve, a cylinder for said piston having an oil pressure source upon one side and an oil outflow pipe upon the other side of the piston, a spring adapted to press the piston toward the oil pressure source, a member between the cylinder head and the piston for closing the piston openings, and an axially disposed spindle having threaded engagement with and through the cylinder head and carrying said closing member.

5. A quick closing throttle valve for turbines comprising, in combination, a main valve for controlling the admission of steam to the turbine, an auxiliary valve also controlling the admission of steam to the turbine the effective area of the main valve being greater than that of the auxiliary valve, a piston having openings therethrough and operatively connected with both valves, the main valve being arranged to both open and close after the auxiliary valve, a cylinder for said piston having an oil pressure source upon one side and an oil outflow pipe upon the other side of the piston, and means for closing said piston openings preparatory to opening said auxiliary and main valves when it is desired to start the turbine.

6. A quick closing throttle valve for turbines comprising in combination, a main valve for controlling the admission of steam to the turbine, said main valve having an opening through its face, an auxiliary valve arranged to open and close said opening, a piston having openings therethrough and operatively connected with both valves, the main valve being arranged to both open and close after the auxiliary valve, a cylinder for said piston having an oil pressure source upon one side and an oil outflow pipe upon the other side of the piston, and means for closing said piston openings preparatory to opening said auxiliary and main valves when it is desired to start the turbine.

In testimony whereof, I have hereunto set my hand in the presence of two subscribing witnesses.

KARL RÖDER. [L. S.]

Witnesses:
 HELEN NUFER,
 ALBERT NUFER.